(12) United States Patent
Iden

(10) Patent No.: US 9,004,994 B2
(45) Date of Patent: Apr. 14, 2015

(54) AIR BAFFLES IN RAILROAD TUNNELS FOR DECREASED AIRFLOW THEREIN AND IMPROVED VENTILATION AND COOLING OF LOCOMOTIVES

(75) Inventor: Michael E. Iden, Kildeer, IL (US)

(73) Assignee: Union Pacific Railroad Company, Omaha, NE (US)

(*) Notice: Subject to any disclaimer, the term of this patent is extended or adjusted under 35 U.S.C. 154(b) by 424 days.

(21) Appl. No.: 13/346,370

(22) Filed: Jan. 9, 2012

(65) Prior Publication Data
US 2013/0178143 A1 Jul. 11, 2013

(51) Int. Cl.
*E21F 1/00* (2006.01)

(52) U.S. Cl.
CPC ........................... *E21F 1/003* (2013.01)

(58) Field of Classification Search
CPC ............ F24F 1/003; F24F 7/06; B61B 13/10
USPC ........... 454/166, 167; 181/264, 285; 405/132, 405/147
See application file for complete search history.

(56) References Cited

U.S. PATENT DOCUMENTS

| | | | |
|---|---|---|---|
| 1,409,545 A * | 3/1922 | Harris | 454/166 |
| 4,037,526 A | 7/1977 | Jaekle | |
| 4,567,817 A | 2/1986 | Fleischer et al. | |
| 4,907,910 A | 3/1990 | Teron | |
| 5,069,115 A | 12/1991 | Fleischer | |
| 5,755,215 A * | 5/1998 | Mickens et al. | 126/547 |
| 6,439,840 B1 * | 8/2002 | Tse | 415/119 |
| 2006/0060217 A1 * | 3/2006 | Wilsey | 134/18 |
| 2009/0277605 A1 * | 11/2009 | VanGilder et al. | 165/67 |
| 2010/0021718 A1 * | 1/2010 | Vos et al. | 428/315.9 |

FOREIGN PATENT DOCUMENTS

RU 2332571 C1 8/2008

OTHER PUBLICATIONS

Bonnett, Practical Railway Engineering, 2005, Imperial College Press, 2nd Edition, pp. 53-55.*
Daugherty, Piston Effect of Trains in Tunnels, Transactions of the American Society of Mechanical Engineers, Feb. 1942, pp. 77-84.
Edenbaum et al., Predicting New Double-Stack Train Operations in a Naturally Ventilated Tunnel, IHHA, May 2011.

(Continued)

*Primary Examiner* — Gregory Huson
*Assistant Examiner* — Dana Tighe
(74) *Attorney, Agent, or Firm* — Pillsbury Winthrop Shaw Pittman, LLP

(57) ABSTRACT

Disclosed is a system and method for decreasing airflow and improving ventilation within a tunnel, such as a railroad tunnel, including a path for movement of a vehicle (e.g., train) therethrough. The system has a plurality of air baffles mounted within the tunnel, each device comprising a body and a mounting device. Each mounting device positions each body inside and along the length of the tunnel between the entrance and the exit. The air baffles are configured to restrict airflow at least in part in a longitudinal direction of the tunnel, thereby increasing a relative difference between a vehicle speed and air speed in a tunnel annulus when the vehicle passes through the tunnel. The restriction (e.g., decrease) of airflow in the tunnel reduces the piston effect resulting from the vehicle or train passing through, thus reducing emissions and heat generated by the locomotives in the tunnel.

34 Claims, 9 Drawing Sheets

(56) References Cited

OTHER PUBLICATIONS

Subway Environmental Design Handbook, vol. II, Subway Environmental Simulation Computer Program, SES Version 4.1, Part I User's Manual, Feb. 2002.

Karloff et al., Measurement of Air Flow past Freight Trains through Long Tunnels, Proceedings of the 1999 IEEE/ASME Joint Rail Conference, Apr. 13-15, 1999, pp. 102-111, IEEE Catalog No. 99CH36340, ASME RTD vol. 16, Dallas, TX.

* cited by examiner

AIR BAFFLES IN RAILROAD TUNNELS FOR DECREASED AIRFLOW THEREIN AND IMPROVED VENTILATION AND COOLING OF LOCOMOTIVES

BACKGROUND

1. Field

The present disclosure is generally related to improving ventilation within railroad tunnels by using air baffles to increase relative movement of air in the tunnel annulus as a train passes through.

2. Description of Related Art

Freight trains are often used to transport goods. As freight trains pass through railroad tunnels, particularly at lower speeds, overheating and loss of power of one or more locomotives within the train, and/or stalling of the train, may occur. This may often be caused by at least one of two factors: (1) the "piston effect," and (2) accumulation of heated engine exhaust, hot radiator air, and pollutant gases. The "piston effect"—also referred to as the plunger effect—is a result of displacement flow which is the bulk movement of air or gases in a space, such as by the action of a piston or plunger in a cylinder-like shape. In the case of a train moving through a tunnel, for example, a leading locomotive (i.e., piston) tends to push air in the tunnel (i.e., cylinder) ahead of the train, thereby creating this effect. This results in lower air pressure in the tunnel and a reduction in air speed along the train. Additionally, as the train moves through the tunnel, the locomotive unit(s) expel exhaust gases and heated radiator cooling air (waste heat) into the air above and alongside the locomotive unit(s)—an area also referred to as the tunnel annulus. Because the piston effect reduces the flow of fresh air into the tunnel annulus (alongside the locomotive unit(s)), the exhaust gases and heated radiator cooling air tends to accumulate in the tunnel alongside the locomotive unit(s), particularly in tunnels of long length, and may move along with the locomotive unit(s) at the same or near-same relative speed. This is a particular problem for long freight trains incorporating multiple locomotives, as the locomotives, especially those further back in the train, will be forced to intake that heated/contaminated air.

The combined result of these factors is that the locomotive(s) may experience overheating due to resulting excessive radiator water and engine lubricating oil temperatures, for example, with the locomotives thus de-rating in power output or sometimes losing traction power. Also, lower air pressure in the tunnel, as caused by the piston effect, means less fresh air is available for intake and use in engine combustion. This may result in the train stalling in the tunnel. Such stalling incidents cause train delays, as well as risks to employees or personnel called to correct the problem.

To address such problems, several methods have been tried. Most railroad tunnels in the U.S., Canada, and Mexico are non-ventilated; however, a small number of railroad tunnels are equipped with powered, stationary ventilation fan equipment mounted therein in the hopes of preventing such problems (see, e.g., U.S. Pat. No. 4,567,817). Russian Patent Document No. RU 2332571 introduced flaps attached to a locomotive for trying to moving air within tunnels. Tunnel exit "curtains" have also been tried, such as illustrated in U.S. Pat. No. 4,037,526 to Jaekle, assigned to Southern Pacific Transportation Company. However, such curtains have proved to be maintenance-intensive and have been used sparingly.

SUMMARY

An aspect of the disclosure provides a system for improving ventilation within a tunnel, the tunnel having an entrance, an exit, and a length therebetween and including a path for movement of a vehicle therethrough. The system includes a plurality of air baffles mounted within the tunnel, each device including a body and a mounting device. Each mounting device positions each body inside the tunnel along its length between the entrance and the exit. The air baffles are configured to restrict airflow at least in part in a longitudinal direction of the tunnel, thereby increasing a relative difference between a vehicle speed and air speed in a tunnel annulus when the vehicle passes through the tunnel.

Another aspect of the disclosure provides a method for decreasing airflow within a tunnel, the tunnel having an entrance, an exit, and a length therebetween and including a path for movement of a vehicle therethrough. The method includes: providing a plurality of air baffles, each device comprising a body and a mounting portion, each mounting portion configured to position each body inside the tunnel along its length between the entrance and the exit, and positioning the plurality of air baffles in the tunnel using the mounting devices. The air baffles are configured to restrict airflow at least in part in a longitudinal direction of the tunnel, thereby increasing a relative difference between a vehicle speed and air speed in a tunnel annulus when the vehicle passes through the tunnel.

Other features and advantages of the present disclosure will become apparent from the following detailed description, the accompanying drawings, and the appended claims.

BRIEF DESCRIPTION OF THE DRAWINGS

FIGS. 14-17 illustrate air baffles of alternate shapes for mounting on tunnel walls and movement of air relative to the air baffles as a train passes through.

DETAILED DESCRIPTION OF THE PREFERRED EMBODIMENT(S)

Figure 1:
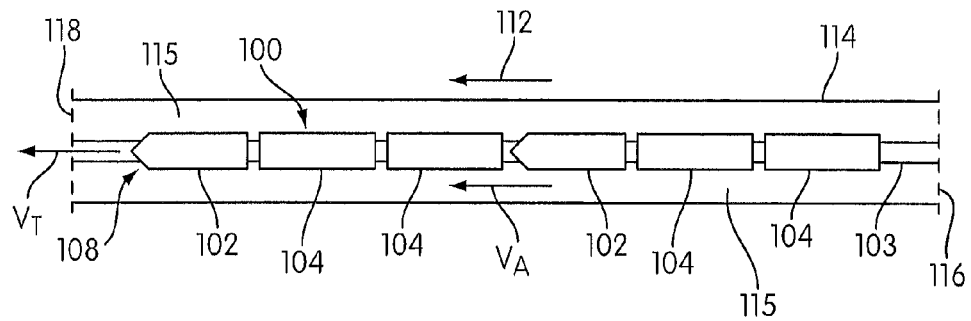
FIG. 1 illustrates an overhead view of a train travelling through a tunnel along a track.

It is generally known that the combined discharge of both engine exhaust and heat-carrying "cooling" air into the roofspace of the tunnel results in downward flow of exhaust, thus contaminating air in the tunnel annulus, which is defined as the area between the sides of the train (e.g., locomotive and cars) and the walls of the tunnel. FIG. 1 illustrates an overhead view of a freight train 100 travelling through a tunnel 114 along a track or rails 103 (or path). The freight train 100 generally comprises at least one (leading) locomotive 102 at a front end 108 of the train for pulling one or more cars 104 (e.g., in a series or set) on railroad tracks or rails 103. A "car" may be generally referred to as a body with track engaging wheels 106 (e.g., see FIG. 3) and couplings that is connected in a train 100 for transporting items, and will become more evident by the description below.

In some cases, freight train 100 is used to transport goods, cargo, and other items that are of higher weight. Generally, throughout this description, the term "cargo" is used and defined as items for transport using the train 100. For example, cargo may comprise people, objects, liquids, and other transportable goods, and should not be limiting. One or more of the cars 104 may be configured to transport cargo. As such, to transport such cargo, in some embodiments, a leading locomotive 102 may comprise a locomotive consist comprising a collection of two or more locomotives connected to each other in a series. Thus, for example, two or three locomotives may be provided at the front 108 of the train 100 to lead the train 100 along the tracks 103. In some embodiments, such as shown in FIG. 1, locomotive(s) 102 may be placed within the length of train 100 (in addition to a leading locomotive). In some embodiments, a plurality of series of cars 104 is provided. For example, in FIG. 1, a leading locomotive 102 configured to lead the train 100 along the tracks 103 is provided, and a following locomotive 102 is located rearward of the leading locomotive 102 which is configured to assist in moving the train 100 and cars 104 along the tracks 103. Generally a second or following locomotive or locomotive consist 102 may be provided in any number of positions along the length of the train 100. In some cases, the placement of one or more locomotives 102 may be based upon the weight of the cargo or items being transported. The number of locomotives in the train 100, however, should not be limiting.

Each locomotive 102 comprises a body and track engaging wheels for moving cars 104. The locomotive(s) 102 also comprise a power system for driving the track engaging wheels of the locomotive(s) 102 to move the locomotive(s) and the cars 104 along the tracks 103. The power system may be of any type, including but not limited to a diesel engine, an AC or DC generator powered by a diesel engine, a fuel cell, a battery, a flow battery, or any other system for providing locomotive power.

The freight cars 104 may be loaded or empty. The cars 104 may be any type of car and any combination of types of cars. For example, types of cars 104 in train 100 may include, but are not limited to, flat or gondola cars, box cars, tanks, hopper cars, and well cars. In some embodiments, one or more of the cars 104 may be configured to include a container for storing cargo. For example, a car 104 may comprise a well car for receiving a container for transportation. Generally, containers are used to store and transport goods, cargo, and other items, as is known in the art. The containers may comprise containers that are removably or permanently mounted on a car body with wheels, and should not be limiting. For example, the containers may be intermodal, sealed, refrigerated, temporary, etc.

In any case, the freight train 100 may move through tunnel 114 at a desired speed in a direction 112 through a tunnel entrance 116 and along its length in a longitudinal direction towards a tunnel exit 118 to pull the cars 104 therethrough. As the freight train 100 moves therethrough, there is a possibility for overheating and/or stalling (or near-stalling) of one or more locomotives 102 in train 100. For example, the air movement halfway through or in the midsection of the tunnel 114, such as near second locomotive 102 in FIG. 1, is substantially low. Thus, the tunnel annulus contains a significant amount of contaminated and heated air. In a non-ventilated railroad tunnel (including a tunnel without a door or a curtain enclosing an exit portal), air inside the tunnel, i.e., in the space of the tunnel annulus (alongside the locomotive and rail cars of the train 100) tends to move with the train 100. Annulus air speed or velocity, $V_A$, is usually less than train speed or velocity, $V_T$. The velocity of the air speed $V_A$ in the annulus is relative to the velocity of the train speed, $V_T$. Generally, as train speed $V_T$ drops, so does air speed $V_A$ in the annulus. Accordingly, the air speed in the annulus $V_A$ approaches the train speed $V_T$ ($V_A \rightarrow V_T$). Due to the piston effect, a tunnel can have lower air pressure therein and a reduction in air speed $V_A$ (thus decreasing the relative airflow). Airflow may also be affected by buoyancy, geometrical configuration of trains passing through tunnels, roughness of walls in the tunnel, and outside ambient conditions, for example. Waste heat and combustion gases dissipating from the locomotive(s) moving through the tunnel, therefore, tend to remain within the tunnel around the locomotive(s)/train because of the low relative speed of $V_A$ to $V_T$. This, in turn, leads to an increased risk of locomotive diesel engine overheating and stalling (or near-stalling) because of the accumulated or combined exhaust and pollutant gases and heat in the air of the tunnel annulus.

By increasing the relative airflow, emissions and heat generated by locomotives of trains moving through tunnels can be diluted and overheating of locomotive engines may be decreased, for example. Accordingly, it is a goal of the present disclosure to decrease the air speed $V_A$ in the tunnel annulus, thereby increasing a relative difference between the train speed $V_T$ and air speed $V_A$ in a tunnel annulus as the train passes therethrough. For purposes of this disclosure, "annulus air" refers to the environmental air, exhaust gases, pollutants/contaminants, etc. that are contained within the tunnel, such as those within a center section of the length of the tunnel.

Because of the above noted possibility for overheating and/or stalling (or near-stalling) of one or more locomotives 102, airflow restriction devices 120 or baffles are provided for use in the tunnel 114 to restrict airflow at least in part in a longitudinal direction of the tunnel, thereby increasing a relative difference between the train speed and air speed in the tunnel annulus when the train passes through the tunnel. The term "baffle" as used herein refers to a device for deflecting, checking, or breaking a flow of a fluid. In this case, baffles are used to deflect and/or restrict the flow of air (and any contaminants, pollutants, additives, etc.) within a tunnel. For example, the baffles are used to restrict or reduce motion of air within the tunnel annulus.

As further evident in the description below, it should be understood that the air baffles 120 may be used in tunnels including a path for movement of any typical of vehicle therethrough. For example, besides train tunnels, air baffles 120 may be positioned in tunnels for passage of vehicles such as semi-trailer trucks or tractor trailers. Accordingly, the herein described exemplary application of air baffles 120 to train tunnels should not be limiting.

Figure 2:
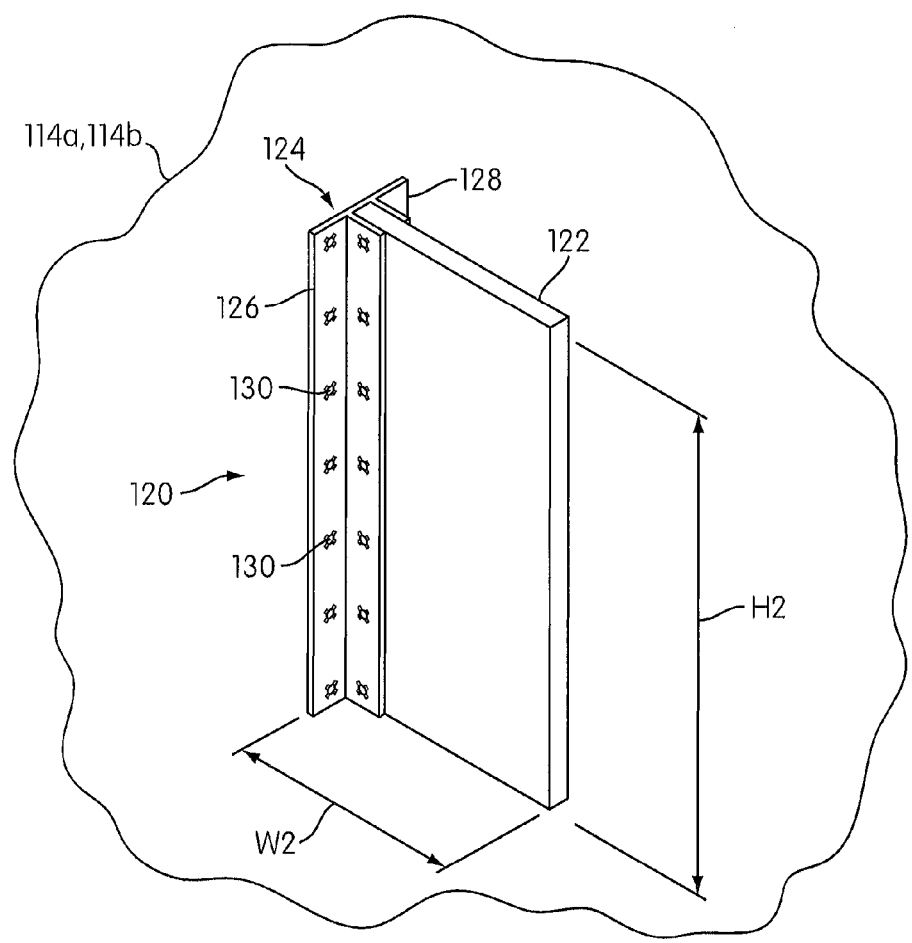
FIG. 2 illustrates a plan view of an air baffle in accordance with an embodiment.

FIG. 2 illustrates a plan view of an air baffle 120 in accordance with an embodiment. Air baffle 120 is configured to restrict airflow at least in part in a longitudinal direction of the tunnel (e.g., in direction 112), thereby increasing a relative difference between a speed of a train (or some other vehicle) and air speed in a tunnel annulus when the train (or vehicle) passes through the tunnel. Each air baffle comprises a body 122 and a mounting portion 124 or device. In an embodiment, body 122 has a front side, back side, top side, bottom side, mounting side (i.e., side used for positioning and/or mounting via mounting portion 124), and annulus side (i.e., side extending into tunnel annulus) (e.g., between tunnels walls and train). In an embodiment, body 122 is formed from a material having at least some amount of structural stiffness. For example, baffle 120 may be an obstruction, plate, wall, or screen. In an embodiment, body 122 may also or alternatively be at least in part resilient such that body 122 may be flexible, and/or have the ability to move or bend relative to movement/ contact, and/or be able to restore substantially to its original shape.

Air baffle 120 comprises a height H2 and a width W2, which are not limited. In an embodiment, width W2 of air baffle 120 is similar to a width of body 122. In an embodiment, height H2 of air baffle 120 is similar to a height of body 122. Examples of these dimensions (H2 and W2) are further described below. In an embodiment, width W2 depends on a width W of a tunnel annulus between a tunnel wall and a side of a passing train (i.e., width of annulus on each side) when passing through tunnel 114. In an embodiment, height H2 of air baffle 120 depends on a height of a train when passing through tunnel 114. In another embodiment, height H2 depends on a height of a top or ceiling of a tunnel. In yet another embodiment, height H2 of air baffle 120 depends on a size of side and/or top walls of a tunnel.

In an embodiment, the air baffle 120 and/or body 122 may have a height (e.g., H2) of about 12 inches to about 18 inches. In another embodiment, the height of air baffle 120 and/or body 122 may be about 14 inches to about 16 inches. In an embodiment, the air baffle 120 and/or body 122 may have a width (e.g., W2) of about 20 inches to about 30 inches. In another embodiment, the width of air baffle 120 and/or body 122 may be about 22 inches to about 26 inches.

Mounting portion 124 is configured to position body 122 inside tunnel 114 at a position along its length between entrance 116 and exit 118. Mounting portion 124 may be directly or indirectly connected to body 122 so as to position and/or mount the body 122 in the tunnel. For example, as shown by the exemplary embodiment of FIG. 2, mounting portion 124 may comprise a device such as a bracket having a first side 126 and a second side 128 for encapsulating an end (e.g., mounting side) of body 122. Mounting portion 124 may comprise similar dimensions as body 122. In the illustrated embodiment, each side 126 and 128 of mounting portion 124 is substantially similar in length (or height) to the mounting side of body 122 (i.e., H2). However, such dimensions are not intended to be limiting.

Fastening devices may be used in openings 130 to fasten mounting portion 124 to body 122 and/or walls of tunnel 114. The same or different types of fastening devices may be used in openings 130 for connecting mounting portion 124 to body 122 or walls. The types of fastening devices should not be limited.

In an embodiment, body 122 and mounting portion 124 may be integrally formed.

As shown and described with reference to FIGS. 3 and 4, in accordance with some embodiments, a plurality of air baffles 120 are part of a system for decreasing airflow within a tunnel 114. Generally, tunnel 114 includes a first (left side) wall 114a, a second (right side) wall 114b, a third (top) wall 114c, and a fourth (bottom, ground) wall 114d. A space between a train (or vehicle) and these walls 114a-114d is the tunnel annulus 115. Generally, the fourth wall 114d provides the path (e.g., track or rails 103) for movement of a vehicle through the entrance 116 and exit 118 of the tunnel 114.

For each air baffle 120, mounting portion 124 is configured to position its respective body 122 within the tunnel annulus 115. More specifically, mounting portion 124 is configured to position body 122 relative to one or more side walls 114a and 114b of the tunnel 114. In accordance with an embodiment, body 122 comprises a shape relative to a shape of an area for positioning the body 122 within the tunnel annulus 115. For example, in the embodiment of FIG. 3 (showing a front view of train 100 within tunnel 114), body 122 comprises a generally rectangular shape that extends from walls 114a and 114b into the annulus 115 (on each side) and towards an area through which a train 100 will pass. Train 100 (including locomotives 102 and cars 104) has an approximate nominal width X, leaving an annulus 115 on each side 114a and 114b of the tunnel 114 of width W. The nominal width X of a train 100 can vary according to types of locomotives, cars, and cargo in the train. For example, the nominal width X of train 100 may be between about 8 feet and 11 feet. As previously noted, width W2 depends on a width W of a tunnel annulus between a tunnel wall and a side of a passing train (i.e., width of annulus on each side) when passing through tunnel 114. The corresponding dimensions of width W of tunnel annulus 115 is determined based on dimensions of each specific tunnel. It should be understood that width W may be variable along a length (in a longitudinal direction) of a tunnel and/or along a height (in a vertical direction) of a tunnel depending on the type of tunnel and/or configuration of the tunnel. Based on an approximate nominal width X of the train 100 and width W of annulus 115, a clearance distance d is determined on each side in order leave space between the annulus side of body 122 of air baffle 120 and the train 100 as it moves through the tunnel 114. (The tunnel 114, therefore, has an approximate width of W2+d+X+d+W2.) Thus, in an embodiment, each air baffle 120 comprises a width W2 determined to be about—at most—the difference between width W and clearance distance d. Width W2 of air baffle 120 is smaller than width W.

In an embodiment, the clearance distance d may be about 1 foot to about 3 feet. In an embodiment, the clearance distance may be about 1½ feet to about 2 feet.

Accordingly, it should be understood that the dimensions noted herein are exemplary and not meant to be limiting. For example, the width W2 of the air baffles 120 (and its body 122, if necessary) can be adjusted based on a width W and a clearance distance d (which are also variable).

In an embodiment, one or more of the air baffles 120 is configured to be positioned at a height h above the ground 114d of tunnel 114. In an embodiment, the mounting portion is configured to position the body such that it is a height h above the ground 114d of the tunnel. For example, a bottom side of the body 122 of each airflow device 120 may be configured such that it is at a height h above the ground 114d. In accordance with an embodiment, the height h for positioning one or more of the air baffles 120 may be determined based on safety considerations. For example, railroad employees or servicemen may need to access the tunnel and/ or parts of a stationary train within a tunnel. Accordingly, the height h may be determined such that a person or persons can walk under the air baffles 120 without striking a bottom side and/or needing to compensate to prevent collision therewith (e.g., move or bend down). In one embodiment, height h may consider not only height of a person but also of a transportation device for moving within the tunnel (e.g., electric cart). In another embodiment, each of the air baffles 120 may be positioned at the same height h above the ground 114d. In yet another embodiment, the air baffles 120 are positioned at different heights h above the ground 114d.

In an embodiment, the mounting portion is configured to position the body such that its bottom side is at a height h of about 5 feet to about 8 feet above the path or ground 114d of the tunnel 114. In another embodiment, the height h is at least 8 feet.

The height H at which a top of an air baffle 120 may be positioned within the tunnel (and, therefore, a height H2 of an air baffle 120) can vary and is not limiting. Height H is a measurement from ground 114d of tunnel to a top side of air baffle 120. In FIG. 3, a top side of each of the air baffles 120 is positioned (e.g., via mounting portion 124) at a height H above the ground 114d that corresponds to an approximate height of train 100. In an embodiment, the mounting portion is configured to position one or more air baffles 120 such that its top side is at a height H about 10 feet to about 16 feet above the ground 114d (or path) of the tunnel 114. In another embodiment, height H is about 12 feet to about 14 feet.

Accordingly, in an embodiment, height H2 of air baffle 120 may be determined by height measurements h and H considered for mounting air baffle within the tunnel. For example, height H2 may be approximately H−h. In another embodiment, height H2 depends on a height of a top or ceiling of a tunnel.

In yet another embodiment, the height of an air baffle depends on size(s) and/or dimension(s) of side and/or top walls of tunnel 114. FIG. 4 illustrates air baffles 132 in accordance with another embodiment, wherein a body of each air baffle 132 comprises a shape that corresponds to a shape of both walls 114a (or 114b) and top wall 114c. More specifically, a top side of each air baffle 132 is curved or shaped according to the arc or curve or shape of a transition between the tunnel side wall(s) 114a, 114b and top wall 114c. Air baffles 132 may be positioned and/or mounted using mounting portions 124 as previously described, for example, or other positioning devices.

Air baffles 120 are mounted at an approximate height H3 above the ground 114d of tunnel 114, such that extends to the top wall or ceiling of the tunnel and above the height of the train. Also, as shown, the air baffles 132 may be positioned at a height h above the ground 114d, and may comprise a width W2, both of which may be of similar dimensions as noted above. Accordingly, in an embodiment, one or more of the air baffles 132 may comprise a height H2 of approximately H3-h.

The materials used for manufacturing body 122 (or any parts of air baffles 120) should not be limiting. In an embodiment, body 122 comprises one or more materials that are fire-resistant or fireproof. Body 122 may also or alternatively comprise one or more materials that are resistant to water, humidity, a range of air temperatures (e.g., between 0 degrees to 300 degrees Fahrenheit), and/or materials within tunnels (including those materials resulting from the tunnel itself and in exhaust gases). In embodiments, the body may comprise one or more materials selected from the group consisting of: a para-aramid fiber material (e.g., Kevlar®), a meta-aramid material (e.g., Nomex®), nylon, and/or an elastomer (e.g., a high temperature withstanding rubber). In another embodiment, the body 122 may comprise a woven fabric comprising one or more of these materials, and/or shape memory materials.

Referring now more specifically to FIGS. 5-11, this disclosure provides a system and method for decreasing airflow within a tunnel comprising a plurality of air baffles 120 (or 132) configured to be positioned inside the tunnel 114 along its length (e.g., on walls 114a and 114b) between the entrance 116 and the exit 118. In an embodiment, the air baffles are configured for positioning in pairs. For example, each pair may comprise a first air baffle and a second air baffle, the first air baffle being positioned relative to a first side wall (e.g., wall 114a) within the tunnel and wherein the second air baffle is positioned relative to a second, opposite side wall (e.g., wall 114a) within the tunnel annulus.

Figure 5:
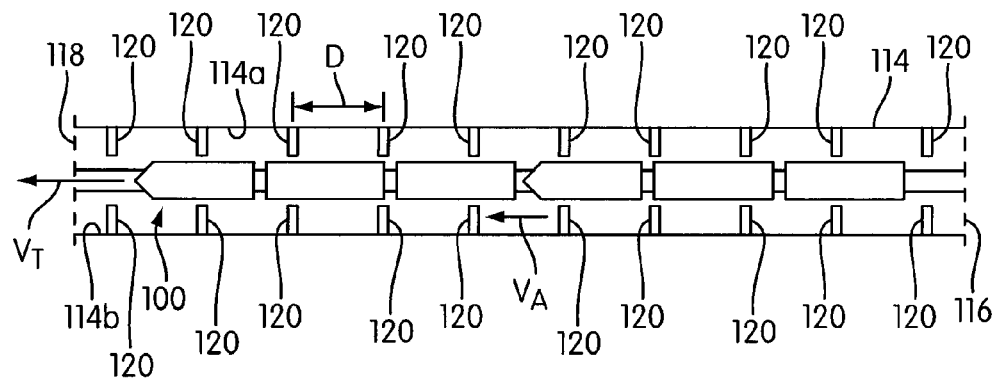
FIG. 5 illustrates a tunnel having a system comprising a plurality of air baffles positioned in a symmetrical configuration in accordance with an embodiment.

FIG. 5 illustrates a tunnel 114 having a system comprising a plurality of air baffles 120 positioned in a symmetrical configuration on walls 114a and 114b and relative to each other. For example, the air baffles may be considered in pairs. In FIG. 5, each of the first and second air baffles 120 of each pair are positioned on their respective side walls 114a or 114b such that the first air baffles 120 on the first side wall 114a are arranged in a symmetrical configuration relative to the second air baffles 120 on the second side wall 114b (i.e., directly opposite each other). In this embodiment, each of the devices 120 are positioned at about a distance D from each other (distance D being measured from an approximate center of one device 120 to an approximate center of another device).

Figure 6:
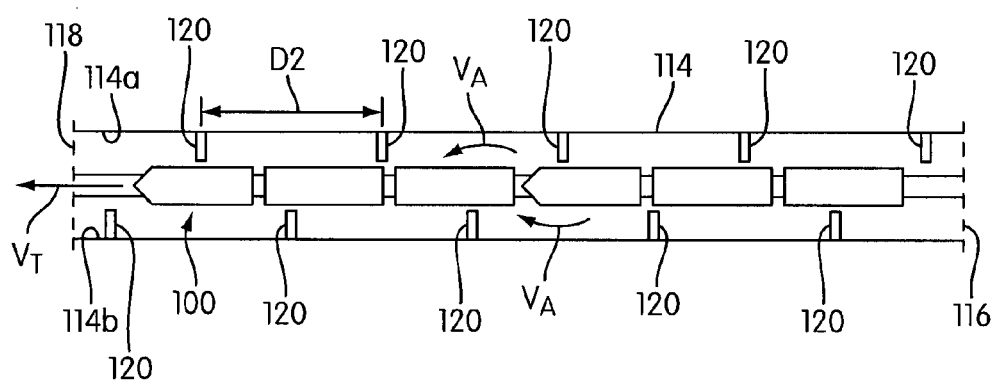
FIG. 6 illustrates a tunnel having a system comprising a plurality of air baffles positioned in an asymmetrical configuration in accordance with another embodiment.

FIG. 6 illustrates another embodiment wherein the tunnel 114 has a system comprising a plurality of air baffles 120 positioned in an asymmetrical configuration on walls 114a and 114 relative to each other. Each of the first and second air baffles 120 are positioned relative to each other such that the first air baffles 120 on the first side wall 114a are arranged in an asymmetrical configuration relative to the second air baffles 120 on the second side wall 114b (i.e., not opposite each other). However, in an embodiment, the first and second air baffles 120 may be positioned on their respective side walls 114a, 114b such that they are spaced relative to each other. For example, each of the devices 120 are positioned at about a distance D2 from each other (distance D2 being measured from an approximate center of one device 120 to an approximate center of another device) on their respective side walls 114a or 114b, but are in a staggered configuration such that an air baffle 120 is not provided directly opposite on opposite side wall.

Nonetheless, as the train 100 travels at a speed through tunnel 114, the flow $V_A$ the annulus air of either configuration shown in FIG. 5 or 6 will be restricted between adjacent devices 120 (as shown by the representative arrows, for example). Specifically, the annulus airflow $V_A$ in FIG. 5 is limited in its movement and speed in a longitudinal direction between devices 120. As shown by the arrow in FIG. 6, the direction and speed of annular air $V_A$ can vary based on the positioning of air baffles 120. However, in both configurations, the annulus air speed $V_A$, is restricted at least in part in a longitudinal direction of the tunnel, thereby increasing a relative difference between a vehicle speed $V_T$ and air speed $V_A$ during passing of the train 100. As disclosed above, this, in turn, improves ventilation within the tunnel 114 by limiting the piston effect resulting from the vehicle or train passing through, thus reducing emissions and heat generated by the locomotives in the tunnel (which thereby decreases and/or prevents likelihood of engine stall).

Figure 7:
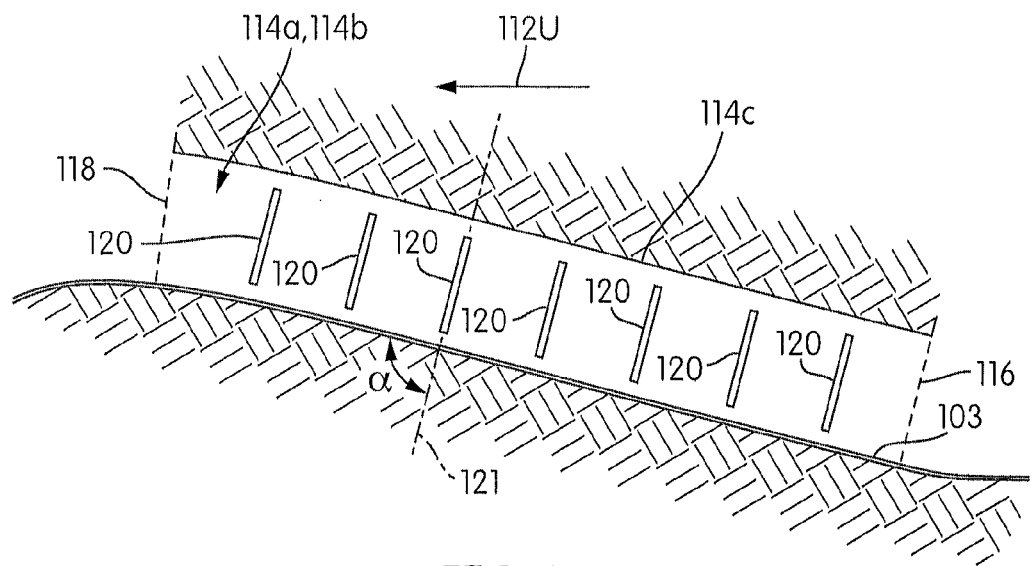
FIG. 7 illustrates a cross sectional, side view of a tunnel showing mounting positions of air baffles therein in accordance with an embodiment.

FIG. 7 illustrates a cross sectional view of a tunnel 114 showing mounting positions of air baffles 120 on a wall such as 114a and/or 114b therein in accordance with an embodiment. Although tunnel 114 (its roof 114c and rails 103) is shown at an angle that is configured for train passthrough in an uphill direction (as represented by arrow 112U), it should be noted that the illustrated directionality for train travel and positioning of the tunnel is exemplary only and not meant to be limiting. Rather, FIG. 7 is provided to show an embodiment wherein an angle α is considered during mounting and positioning of the air baffles 120 within a tunnel. Specifically, the air baffles are positioned on a wall 114a and/or 114b at an angle α relative to the rails 103 within the tunnel 114. The baffles as shown in FIGS. 5 and 6, for example, could be positioned at such an angle α, relative to the rails 103. Angle α is an angle taken from a centerline 121 of the mounting portion 124 of an air baffle 120 (e.g., the centerline extending in a substantially vertical direction) relative to a top of the rails 103 (e.g., relative to a plane at which rails 103 are positioned, e.g., a plane in a horizontal direction or a plane parallel to the direction of travel (arrow 112U)), as shown in FIG. 7. For example, as further described below, mounting portion 124 may comprise a hinge mechanism configured to enable body 122 to be rotated thereabout and mounted at an angle relative to a wall, for example. In an embodiment, the angle α is taken from a centerline 121 of both mounting portion 124 and body 122 of an air baffle 120. For example, when using a mounting portion 124 (such as shown in FIG. 2), both a centerline 121 of the mounting portion 124 and body 122 are aligned and used to provide air baffle 120 at angle α, as shown in FIG. 7. In accordance with an embodiment, the angle α at which each of at least mounting portions 124 of air baffles 120 is positioned relative to the rails 103 is between about 60 degrees and 120 degrees. In an embodiment, each of at least mounting portions 124 of the air baffles 120 in the tunnel are configured to be mounted such that they are substantially perpendicular to the rails 103, i.e., angle α is about 90 degrees. As shown in FIG. 7, in an embodiment, bodies 122 of air baffles can also be positioned substantially perpendicular to the rails 103, i.e., angle α of each body 122 relative to the rails 103 is about 90 degrees.

Figure 8:
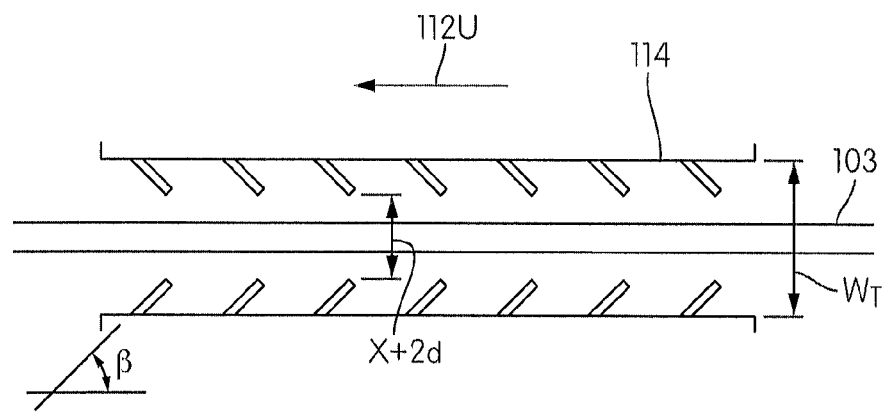
FIG. 8 illustrates an overhead view of a tunnel showing mounting positions of air baffles therein in accordance with another embodiment.

FIG. 8 illustrates an overhead view of a tunnel showing mounting positions of air baffles at another angle β therein, in accordance with another embodiment. The angle β may be considered during mounting and positioning of the air baffles 120 within a tunnel. Specifically, the air baffles are positioned on a wall 114a and/or 114b of tunnel 114 at an angle β relative to the wall 114a and/or 114b. Angle β can be an acute or obtuse angle, depending on the reference point and/or direction of movement through the tunnel. The baffles as shown in FIGS. 5 and 6, for example, are positioned at an angle β of about 90 degrees, relative to the their respective mounting wall 114a or 114b. Accordingly, angle β is defined as an angle taken from a centerline of a body 122 of an air baffle 120 (e.g., in a vertical or longitudinal direction through the body 122) relative to a wall 114a or 114b or other surface the air baffle 120 is configured to be mounted thereto (e.g., relative to a plane at which walls 114a and/or 114b are generally positioned, e.g., a plane in a longitudinal direction of the tunnel or a plane relative to the direction of travel (arrow 112U)), as shown in FIG. 8. In accordance with an embodiment, the angle β at which each of the air baffles 120 is positioned relative to their respective wall 114a or 114b for mounting is between about 30 degrees and 120 degrees. In an embodiment, the angle β is between about 45 degrees and 90 degrees. In an embodiment, each of the air baffles 120 in the tunnel are configured to be mounted such that their bodies 122 are positioned at an angle β of about 45 degrees relative to its mounting wall.

Also shown in FIG. 8 is an approximate clearance width of the baffles—e.g., between an outermost end or corner of two baffles positioned on walls across from each other—when mounting baffles 120 in tunnel 114. As previously noted, the tunnel 114 may have an overall approximate width of W2+d+X+d+W2, shown in FIG. 8 as $W_T$. In an embodiment, a clearance width between the baffles is configured to be at least X+2d, i.e., the nominal width X of train 100 plus the clearance distance d on either side of the train 100 that is determined to leave space between the annulus side of body 122 of each air baffle 120 and the train 100 as it moves through the tunnel. The clearance width between baffles, of course, could be larger. The clearance width between baffles should be greater than the nominal width X of the train 100.

Figure 9:
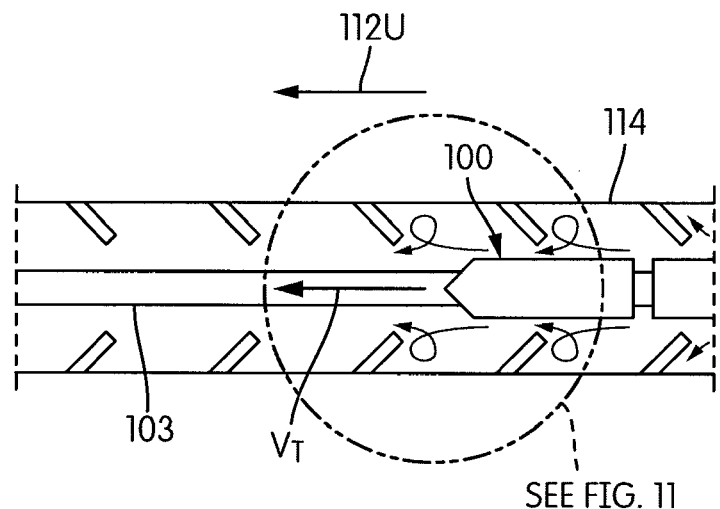
FIG. 9 illustrates air movement within a tunnel with air baffles of FIG. 8 as a train travels therethrough.
Figure 11:
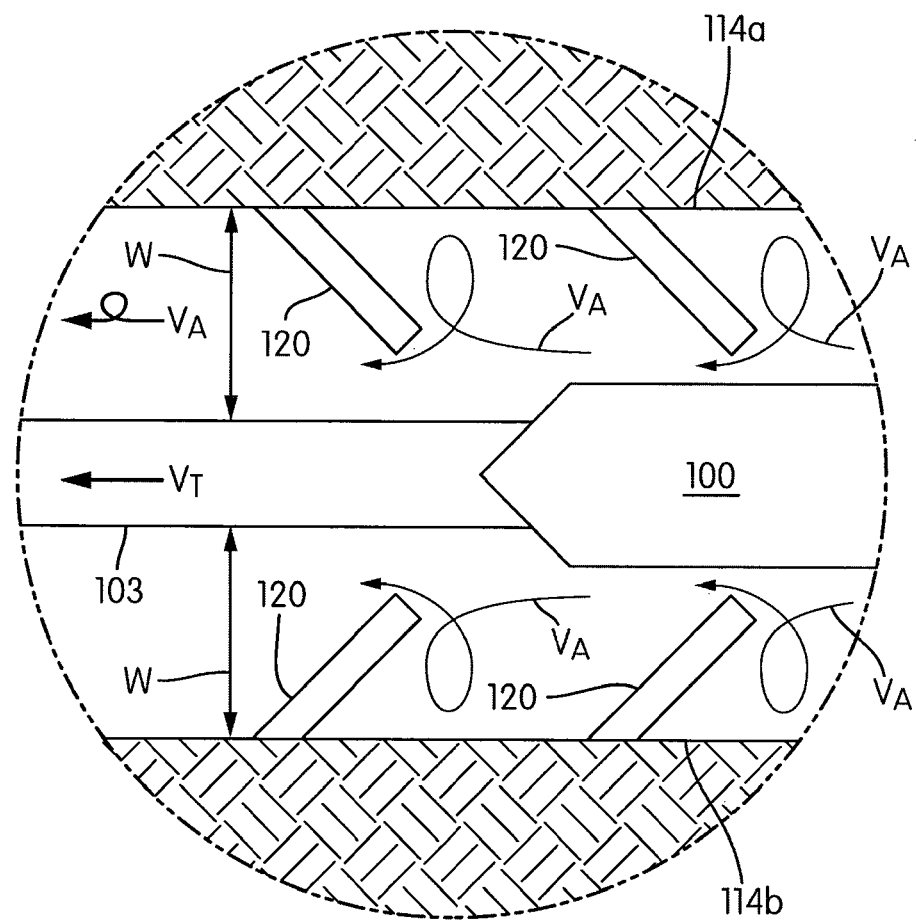
FIG. 11 illustrates a detailed view of affects of air movement by baffles positioned in the tunnel annulus as shown in FIG. 9 as a train passes therethrough.

Accordingly, the mounting angles of air baffles 120 as shown by FIGS. 5-8, for example, can affect air movement within the tunnel 114 as the train travels therethrough (along the length of the tunnel in a longitudinal direction). For example, FIG. 9 illustrates air movement (or restriction of airflow) within a tunnel with air baffles of FIG. 8 as a train travels therethrough in an uphill direction. As the train moves uphill, the locomotive(s) use additional power (such as traction power) to move the containers/cars through at the uphill angle. Specifically, FIG. 9 shows a train 100 traveling uphill as represented by arrow 112U and through tunnel 114. The baffles 120 of FIG. 9 are positioned and mounted at an angle β (see FIG. 8) that is less than about 90 degrees (relative to the walls 114a and 114b). Having baffles set at an angle β that is less than 90 degrees (such as 45 degrees) is designed to increase scooping of annulus air within the tunnel as train passes through (in the uphill direction). Moreover, having air baffles 120 attached to tunnel walls 114a and 114b also creates or increases a turbulence within the annulus air (in annulus spaces), thereby causing mixing of annulus air between tunnel walls and sides of train. FIG. 11 illustrates a detailed view of affects of air movement by baffles positioned in the tunnel annulus as shown in FIG. 9 as a train passes therethrough. As shown, as the train 100 moves through at a speed or velocity $V_T$ (e.g., in direction indicated by arrow 112U in FIG. 9), the annulus air speed or velocity, $V_A$, is reduced and/or at least partially captured as shown by the arrows. More specifically, the annulus air can be captured in a space or length between adjacently mounted baffles 120. In some cases, annulus air speed $V_A$ may be rotated and/or moved and pushed within the space between adjacent baffles. Although annulus air may loop around baffles, during movement of the train 100 therethrough, $V_A$ is substantially reduced. Any turbulence in the annulus 115 is limited by each body 122 of each baffle 120. Additional tunnel wall friction decreases relative annulus air speed between $V_A$ and $V_T$.

Figure 10:
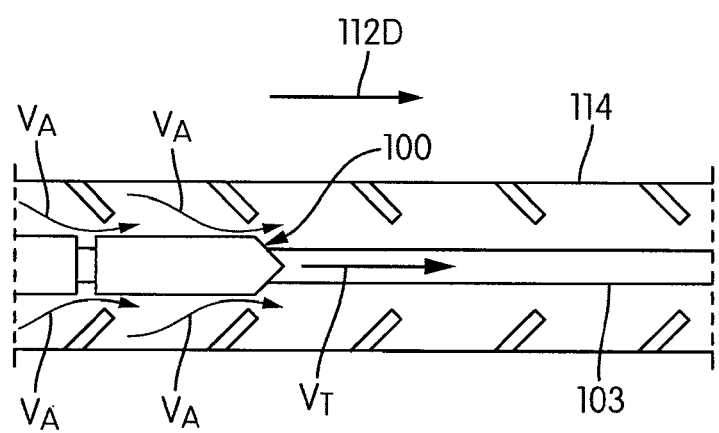
FIG. 10 illustrates air movement within a tunnel with air baffles of FIG. 8 as a train travels therethrough in an opposite direction to that shown in FIG. 9.

FIG. 10 illustrates alternate air movement within a tunnel with air baffles 120 of FIG. 8 as a train travels therethrough in an opposite direction to that shown in FIG. 9, e.g., in a downhill direction, as represented by arrow 112D. The air baffles 120 are positioned and mounted in the tunnel 114 at an angle β that is less than about 90 degrees (relative to the walls 114a and 114b), similar to the baffles shown in FIG. 8, in the uphill direction. Alternatively, one may also consider that the angle β for mounting air baffles 120 is greater than about 90 degrees (relative to the walls 114a and 114b) in the downhill direction (e.g., 135 degrees). In either case, FIG. 10 illustrates air movement within a tunnel 114 as a train 100 travels therethrough at its speed or velocity $V_T$ (e.g., in direction indicated by arrow 112D) in a downhill direction longitudinally through tunnel 114. Baffles set at an angle β are designed to direct annulus air inward, towards sides of the train 100 (e.g., where friction is greatest between annulus air and train sides).

This can cause annulus air movement in downhill direction (same direction as downward-moving train).

Accordingly, FIGS. 9-11 illustrate how additional tunnel wall friction changes relative annulus air speed between $V_A$ and $V_T$ based on the direction (uphill or downhill) the train may be moving.

Figure 3:
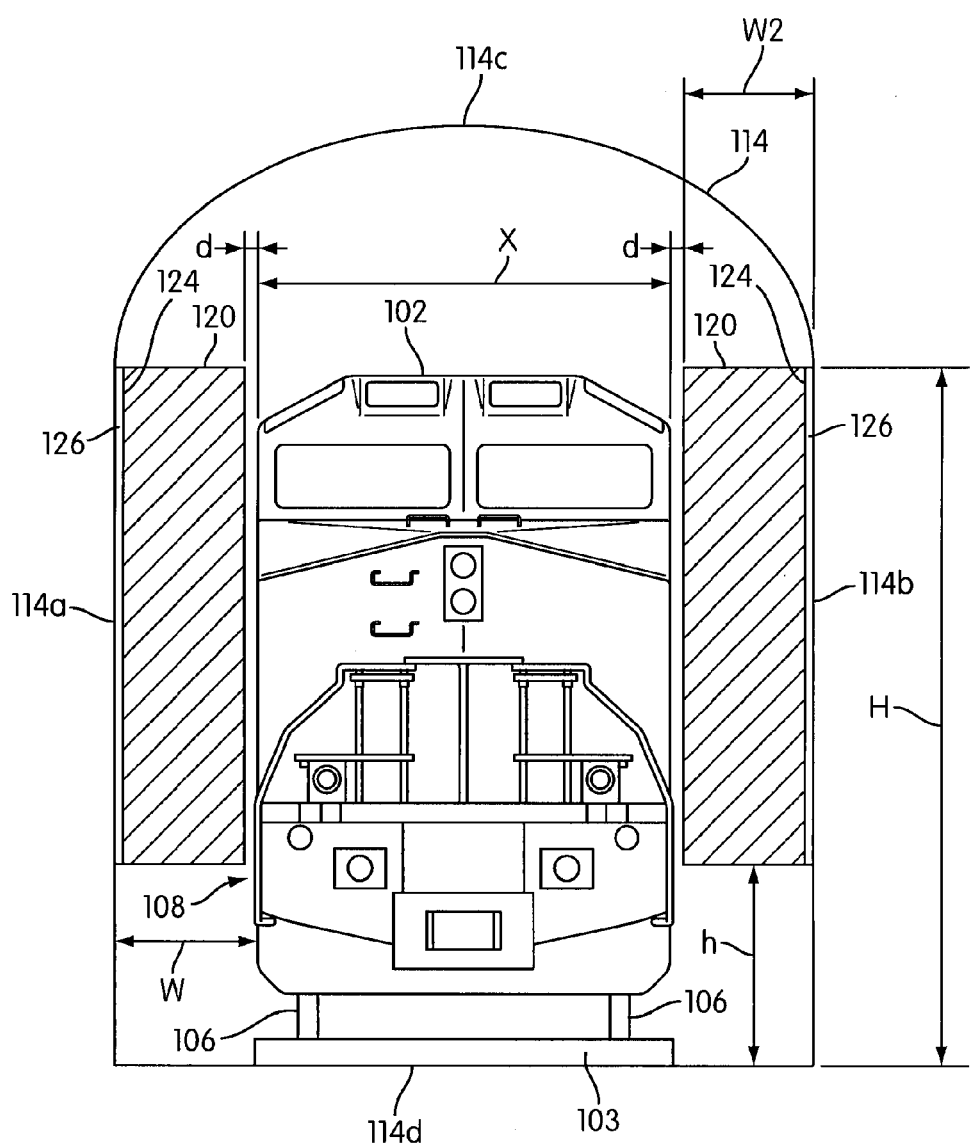
FIG. 3 illustrates a front view of a tunnel with a plurality of air baffles as shown in FIG. 2 mounted in a tunnel in accordance with an embodiment.
Figure 4:
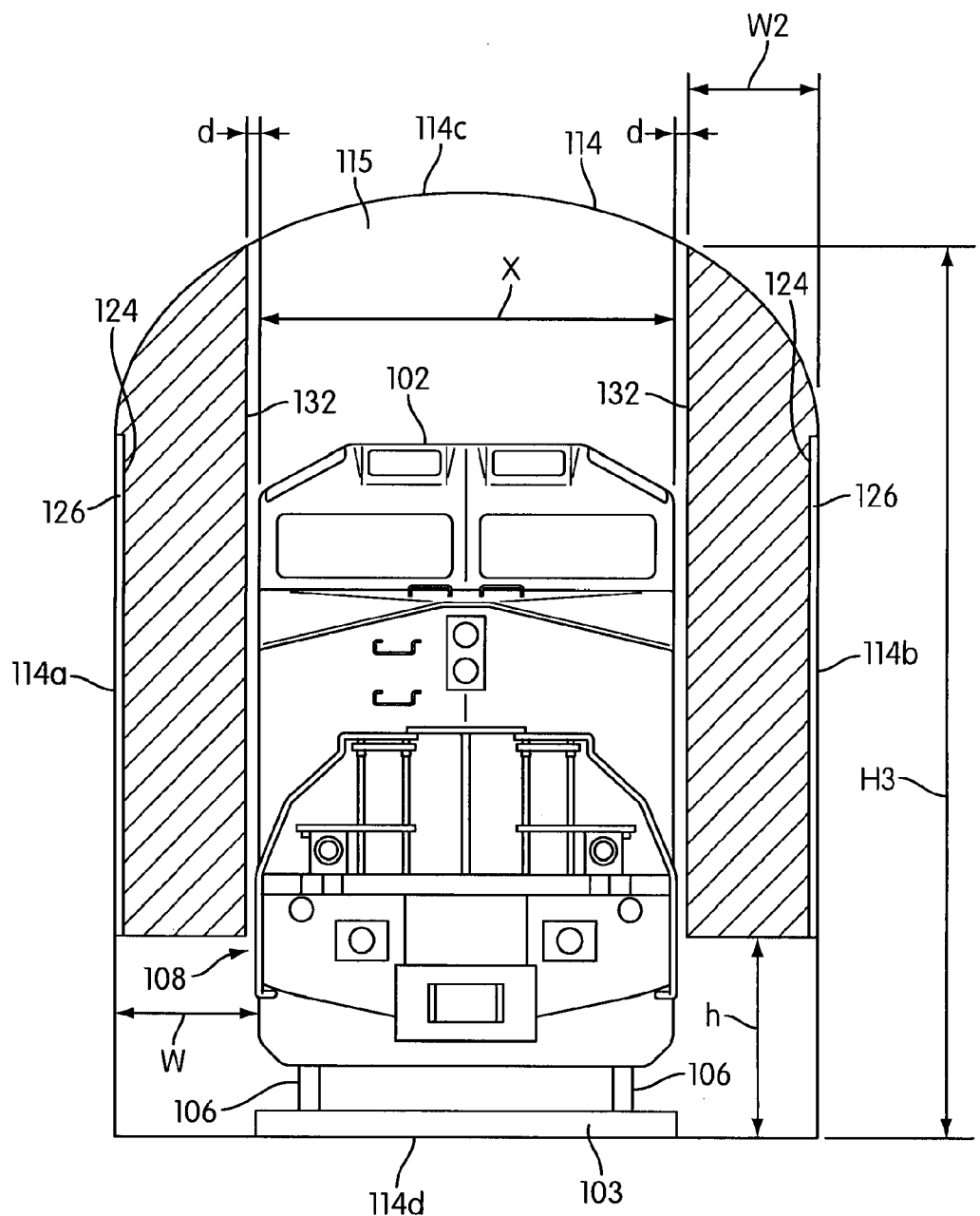
FIG. 4 illustrates a front view of a tunnel with a plurality of air baffles, in accordance with another embodiment, mounted in a tunnel.
Figure 12:
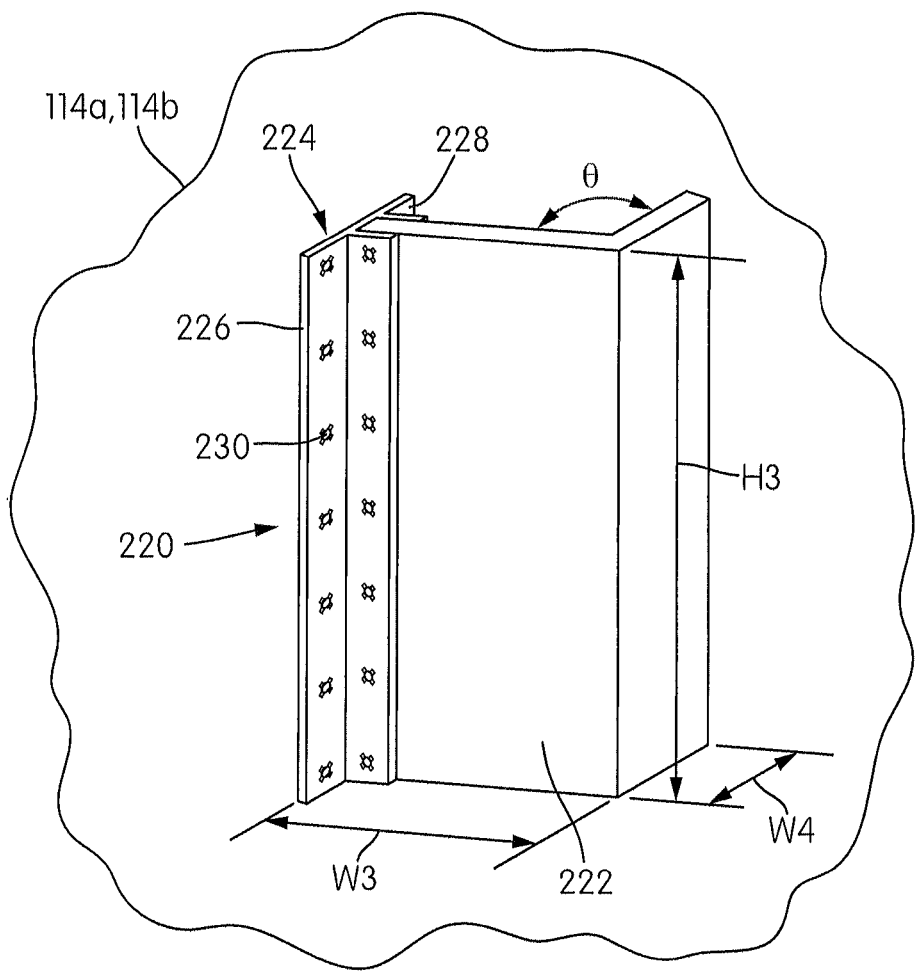
FIGS. 12 and 13 illustrate an overhead view of an angled air baffle in accordance with yet another embodiment.
Figure 13:
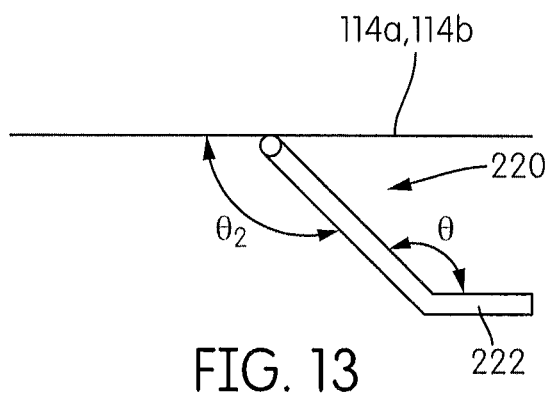

The air baffles 120 need not be provided or limited to the substantially rectangular shape as illustrated in FIGS. 3 and 4 to provide the herein disclosed features and/or advantages. In an embodiment, one or more air baffles 120 may comprise a substantially curved shape. In another embodiment, a plurality of shapes of bodies 122 and/or air baffles 120 may be utilized for restricting airflow in at least the longitudinal direction of the tunnel. FIGS. 12 and 13 illustrate an overhead view of an angled air baffle 220 in accordance with yet another embodiment. Air baffle 220 is configured to restrict airflow at least in part in a longitudinal direction of the tunnel (e.g., in direction 112), thereby increasing a relative difference between a speed of a train (or some other vehicle) and air speed in a tunnel annulus when the train (or vehicle) passes through the tunnel. Each air baffle comprises a body 222 and a mounting portion 224 or device. In an embodiment, body 222 has a front side, back side, top side, bottom side, mounting side (i.e., side used for positioning and/or mounting via mounting portion 224), and annulus side (i.e., side extending into tunnel annulus) (e.g., between tunnels walls and train). In an embodiment, body 222 is formed from a material having at least some amount of structural stiffness. For example, baffle 220 may be an obstruction, plate, wall, or screen. In an embodiment, body 222 may also or alternatively be at least in part resilient such that body 222 may be flexible, and/or have the ability to move or bend relative to movement/contact, and/or be able to restore substantially to its original shape.

Mounting portion 224 is configured to position body 222 inside tunnel 114 at a position along its length between entrance 116 and exit 118. Mounting portion 224 may be directly or indirectly connected to body 222 so as to position and/or mount the body 222 in the tunnel. For example, as shown by the exemplary embodiment of FIG. 12, mounting portion 224 may comprise a device such as a bracket having a first side 226 and a second side 228 for encapsulating an end (e.g., mounting side) of body 222. Mounting portion 224 may comprise similar dimensions as body 222. In the illustrated embodiment, each side 226 and 228 of mounting portion 224 is substantially similar in length (or height) to the mounting side of body 222 (i.e., H3). However, such dimensions are not intended to be limiting.

Fastening devices may be used in openings 230 to fasten mounting portion 224 to body 222 and/or walls of tunnel 114. The same or different types of fastening devices may be used in openings 230 for connecting mounting portion 224 to body 222 or walls. The types of fastening devices should not be limited.

In an embodiment, body 222 and mounting portion 224 may be integrally formed.

Air baffle 220 of FIGS. 12-13 further includes an extension part extending from an end thereof. More specifically, extension part is configured to be a part of body 222 and provided at an angle relative to a main body part (e.g., part comprising a width of W3). The extension part may be configured to extend in a generally longitudinal direction relative to tunnel walls, as shown by the top view in FIG. 13. The extension part can be provided at an angle Θ relative to the main body part. The angle Θ at which extension part is provided may be an acute or obtuse angle, and is not limiting. In an embodiment, the angle Θ is between about 90 degrees and 150 degrees (relative to body 122). In another embodiment, the angle Θ is about 135 degrees.

Main part of air baffle 220 comprises a height H3 and a width W3, and extension part comprises a height H3 and a width W4, which are not limited. In an embodiment, width W3 of air baffle 220 is similar to a width of body 222. In an embodiment, width W3 and width W4 are substantially equal. In another embodiment, width W4 of extension part is smaller than width W3 of main part. In an embodiment, height H3 of air baffle 220 is similar to a height of body 222. Examples of dimensions for H3 and W3 are further described above with reference to air baffle 120 (e.g., they may be similar to those described with reference to H2 and W2). In an embodiment, width W3 depends on a width W of a tunnel annulus between a tunnel wall and a side of a passing train (i.e., width of annulus on each side) when passing through tunnel 114. In an embodiment, height H3 of air baffle 220 depends on a height of a train when passing through tunnel 114. In another embodiment, height H3 depends on a height of a top or ceiling of a tunnel. In yet another embodiment, height H3 of air baffle 220 depends on a size of side and/or top walls of a tunnel. In an embodiment, width W4 depends on a distance or a space between adjacent air baffles.

In an embodiment, extension of body 222 may have a width (W4) of about 10 inches to about 20 inches. In another embodiment, the width of extension may be about 12 inches to about 16 inches.

Accordingly, a plurality of air baffles 220 can be a part of a system for decreasing airflow within a tunnel 114. For each air baffle 220, mounting portion 224 is configured to position its respective body 222 within the tunnel annulus 115. More specifically, mounting portion 224 is configured to position body 222 relative to one or more side walls 114a and 114b of the tunnel 114. In accordance with an embodiment, body 222 comprises a shape relative to a shape of an area for positioning the body 222 within the tunnel annulus 115.

The devices and methods used to position or mount the air baffles 120 and/or 220 should not be limiting, however. For example, it is within the scope of the disclosure that one or more of the air baffles 120, 220 may be positioned at an angle with respect to one or more walls 114a or 114b of tunnel 114. That is, in an embodiment, mounting portion 124 and/or 224 may either position a respective body 122, 222 at an angle relative to a tunnel wall, and/or be configured to be positioned at two or more positions relative to a tunnel wall (e.g., positioned at angle α and angle β as shown in FIGS. 7 and 8) (e.g., either by securing or mounting the portion 124, which angles the body 122 relative to the tunnel wall, or by moving and locking a position of the body 122 relative to mounting portion 124). It is envisioned in another embodiment that mounting portion 124 and/or 224 may comprise a hinge-type device, such that the body may be angled relative to a tunnel wall and/or locked in a position or angle β relative to its mounting wall. For example, FIG. 13 shows a representative example of how a hinge or rotating device can be used to mount air baffle 220 to a wall 114a or 114b. Air baffle 220 can be mounted at an angle relative to the wall 114a or 114b. The baffle can be secured at such an angle (e.g., angle β as shown in FIG. 8) by either by securing or mounting the portion 224 to the wall, or by locking a position of the body 222 relative to mounting portion 224 using a locking device, for example. In an embodiment, angle β is about 45 degrees. Accordingly, as shown in FIG. 13, in an embodiment, the angle opposite to that of angle β in FIG. 8 (relative to a plane along the tunnel wall), angle $Θ_2$, is about 135 degrees. In an embodiment, the angle for hinging and/or mounting the air baffle 220 relative to the wall 114a, 114b may be based on the angle Θ at which the extension part is mounted relative to main part of the body 222, such that the angles Θ and Θ₂ as shown in FIG. 13 are the same or similar. In an embodiment, the angle for hinging and/or mounting the air baffle 220 may be determined based on positioning the extension part of the body 222 such that it is substantially parallel with a plane of a tunnel wall 114a, 114b.

Figure 14:
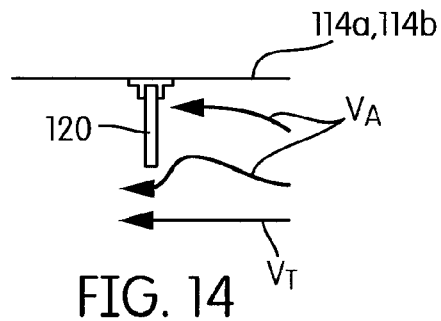
Figure 15:
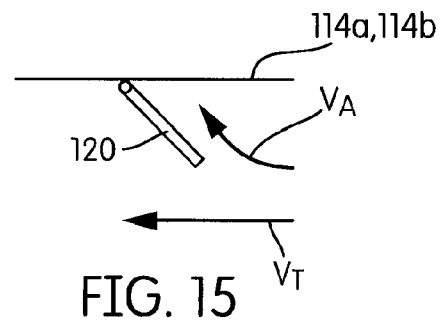
Figure 16:
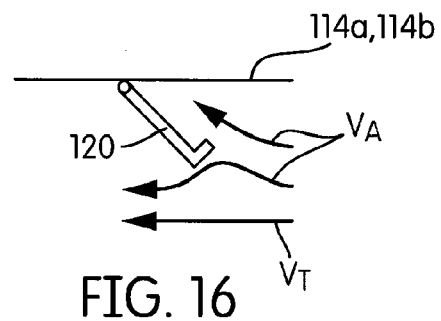
Figure 17:
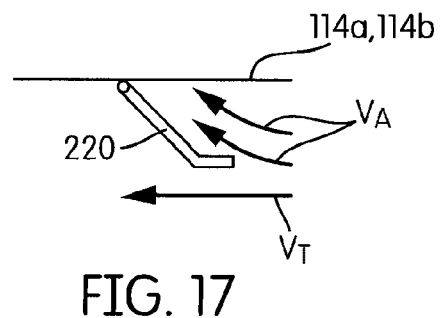

It should be understood that other alternative shapes may be used to form air baffles other than those shown in FIGS. 2 and 12, for example. FIGS. 14-17 illustrate air baffles of alternate shapes for mounting on tunnel walls in accordance with some embodiments. For example, FIG. 14 shows an air baffle similar to air baffle 120 mounted to a tunnel wall at about 90 degrees. FIG. 15 shows an air baffle like air baffle 120 mounted at an angle (e.g., angle β) relative to a tunnel wall, using a hinged mounting device. FIG. 16 illustrates an example of an air baffle 120 with an extension part (described with reference to FIG. 13) extending from a main part at about a 90 degree angle (relative to the main part), and mounted using a hinged mounting device to a tunnel wall. The air baffle can be rotated about its hinge, for example, and mounted at an angle (e.g., angle β) relative to a tunnel wall. FIG. 17 illustrates an example of mounting an air baffle like air baffle 220, described above with reference to FIG. 13. Each of FIGS. 14-17 also illustrates movement of annulus air at a speed $V_A$ relative to the air baffles as a train passes through at a speed $V_T$, as represented by corresponding arrows. Accordingly, each of the Figures show annulus air movement, and how a relative difference between $V_A$ and $V_T$ is achieved by this disclosure.

The arrangement of the air baffles 120 as shown in FIGS. 5-17 and/or use of pairs should not be limiting. In an embodiment, any number of air baffles 120 may be used in tunnel 114. In an embodiment, the positioning and/or placement of air baffles 120 relative to walls 114a-114d of tunnels may be in a predetermined pattern, a sporadic pattern, and/or without a pattern at all. For example, the distances D and/or D2 between air baffles 120 can be varied. Additionally, the angles α and β shown in FIGS. 7 and 8, respectively, are exemplary and may be altered and/or both used for mounting and positioning air baffles 120 in a tunnel 114. For example, in an embodiment, a mounting portion 124 of an air baffle may be mounted at an angle α of about 90 degrees, while the body is positioned (e.g., either by the mounting portion 124 itself or by moving/hinging and securing it so) at an angle β of about 45 degrees.

Moreover, each of the air baffles 120 provided in the tunnel need not be positioned and/or mounted in the tunnel 114 (on tunnel walls 114a and/or 114b) in a similar manner as another or other baffles in the system that are mounted in the tunnel 114. For example, each of the baffles may be mounted at different angles. Also, a number of different types and/or shapes of baffles may be used in a tunnel as part of the system.

Application of air baffles 120, 220 as disclosed in the embodiments described herein are configured to increase relative difference between the train speed $V_T$ and annulus air speed $V_A$ in a tunnel annulus as the train passes therethrough. As previously noted, typically in tunnels (e.g., a concrete-lined tunnel) $V_A$ tends to approach $V_T$ (i.e., no relative air speed). Starting or increasing such a relative difference accordingly dilutes emissions and heat generated by locomotives of trains moving through tunnels decreases and/or prevents overheating of locomotive engines. Each of the herein described and illustrated embodiments shows examples of a system utilizing baffles and methods for decreasing airflow within a tunnel. The mounting and positioning configurations shown are not meant to be limiting. Rather, they are designed to show how air baffles may be configured to restrict airflow at least in part in a longitudinal direction of the tunnel, thereby increasing a relative difference between a vehicle speed and air speed in a tunnel annulus when the vehicle (train) passes through the tunnel.

Additionally, the baffles reduce the speed and/or movement of exhaust gases and/or heated radiator air within the tunnel relative to the locomotive and train speeds. By reducing such flow, the amount of heat/contaminated air intake by the locomotives is reduced. Thus, the temperature of locomotive(s) moving through a tunnel can be reduced (or cooled) and the probability of overheating and/or stalling is substantially reduced.

It should also be understood that a method of using a plurality of air baffles 120 for decreasing and/or restricting airflow at least in part in a longitudinal direction of a tunnel, (such as when a vehicle passes through the tunnel), and thus improving ventilation therein, is also within the scope of this disclosure. For example, in an embodiment, such a method includes providing a plurality of air baffles, such as those described herein wherein each device comprises a body and a mounting portion, and positioning the plurality of air baffles in the tunnel using the mounting devices.

While the principles of the disclosure have been made clear in the illustrative embodiments set forth above, it will be apparent to those skilled in the art that various modifications may be made to the structure, arrangement, proportion, elements, materials, and components used in the practice of the disclosure.

It will thus be seen that the objects of this disclosure have been fully and effectively accomplished. It will be realized, however, that the foregoing preferred specific embodiments have been shown and described for the purpose of illustrating the functional and structural principles of this disclosure and are subject to change without departure from such principles. Therefore, this disclosure includes all modifications encompassed within the spirit and scope of the following claims.

What is claimed is:

1. A system for decreasing airflow mounted in a railroad tunnel for passage of a train comprising at least one locomotive and one or more cars, the tunnel comprising an entrance, an exit, and a length extending in a longitudinal direction therebetween and including a path comprising rails for movement of the train therethrough; the system comprising:
   a plurality of air baffles mounted within the railroad tunnel, each air baffle comprising a body and a mounting portion, the body comprising a top side, a bottom side, a front side, a back side, a mounting side and an annulus side, the annulus side of the body extending into an annulus of the tunnel, the mounting portion on the mounting side of the body, each mounting portion mounting each body on a side wall of the tunnel and positioning the mounting portion inside the tunnel along the length such that the annulus side of each body extends into the tunnel,
   wherein the air baffles are configured to restrict airflow at least in part in the longitudinal direction of the tunnel, thereby increasing a relative difference between the train speed and air speed in the tunnel annulus when the train passes through the tunnel, and
   wherein each mounting portion positions the bottom side of each respective body at a height above the path and rails of the tunnel.

2. The system according to claim 1, wherein each air baffle is positioned such that its body is perpendicular to the rails.

3. The system according to claim 1, wherein the mounting portion positions the front side or the back side of each respective body at an acute angle relative to a side wall of the tunnel.

4. The system according to claim 3, wherein each mounting portion comprises a hinge mechanism configured to enable its respective body to be rotated thereabout.

5. The system according to claim 3, wherein the mounting portion further positions a vertical centerline through each respective body of the plurality of air baffles at a non-right angle relative to the longitudinal direction of the path and rails.

6. The system according to claim 1, wherein the air baffles are configured for positioning in pairs, each pair comprising a first air baffle with a first mounting portion and a separate, second air baffle with a separate second mounting portion, and wherein the first air baffle is positioned relative to a first side wall within the tunnel using the first mounting portion and wherein the separate, second air baffle is positioned relative to a second, opposite side wall within the tunnel using the separate second mounting portion.

7. The system according to claim 6, wherein the first and separate second air baffles are positioned on their respective side walls such that the first air baffles on the first side wall are arranged in a symmetrical configuration relative to the separate second air baffles on the second, opposite side wall such that an annulus side of each first air baffle is substantially directly opposite an annulus side of each separate, second air baffle.

8. The system according to claim 6, wherein the first and second air baffles are positioned on their respective side walls such that the first air baffles on the first side wall are arranged in an asymmetrical configuration relative to the separate second air baffles on the second, opposite side wall such that the first and separate second air baffles are arranged in a staggered configuration relative to the longitudinal direction of the tunnel, wherein an annulus side of each first air baffle is not directly opposite of an annulus side of each separate second air baffle.

9. The system according to claim 1, wherein each mounting portion is configured to position its respective body such that its bottom side is about 5 feet to about 8 feet above the path of the tunnel.

10. The system according to claim 1, wherein each body comprises one or more materials selected from the group consisting of: a para-aramid fiber material, a meta-aramid material, nylon, and an elastomer.

11. The system according to claim 1, wherein the mounting portion positions a vertical centerline through each respective body of the plurality of air baffles at a non-right angle relative to the longitudinal direction of the path and the rails.

12. The system according to claim 1, wherein each mounting portion positions the top side of each respective body at a distance below a top wall or a ceiling of the tunnel.

13. The system according to claim 12, wherein each mounting portion is configured to position its respective body such that its top side is about 10 feet to about 16 feet above the path of the tunnel.

14. The system according to claim 1, wherein the body further comprises a main body part and an extension part, the extension part provided on the annulus side of the body and extending into the annulus of the tunnel, wherein the extension part is provided at a right or obtuse angle relative to the main body part.

15. A method for decreasing airflow within a railroad tunnel for passage of a train comprising at least one locomotive and one or more cars, the tunnel comprising an entrance, an exit, and a length extending in a longitudinal direction therebetween and including a path comprising rails for movement of the train therethrough; the method comprising:
  providing a plurality of air baffles, each air baffle comprising a body and a mounting portion, the body comprising a top side, a bottom side, a front side, a back side, a mounting side and an annulus side, the annulus side of the body extending into an annulus of the tunnel, the mounting portion on the mounting side of the body, each mounting portion mounting each body on a side wall of the tunnel and positioning each body inside the tunnel along the length, and
  attaching the plurality of air baffles on side walls in the tunnel using the mounting portions such that the annulus side of each body extends into the tunnel,
  wherein the plurality of air baffles are configured to restrict airflow at least in part in the longitudinal direction of the tunnel, thereby increasing a relative difference between the train speed and air speed in the tunnel annulus when the train passes through the tunnel, and
  wherein the attaching of each air baffle positions the bottom side of each respective body at a height above the path and rails of the tunnel.

16. The method according to claim 15, wherein the attaching of the plurality of air baffles comprises positioning the front side or the back side of each respective body of the plurality of air baffles at an acute angle relative to a side wall of the tunnel.

17. The method according to claim 16, wherein each mounting portion comprises a hinge mechanism configured to enable its respective body to be rotated thereabout and mount the body in a locked position at the acute angle relative to the side wall, and wherein the positioning of the plurality of air baffles further comprises rotating each respective body about the hinge mechanism to position and lock the body at the acute angle relative to the side wall.

18. The method according to claim 16, wherein the positioning of the plurality of air baffles further comprises positioning a vertical centerline through each respective body at a non-right angle relative to the longitudinal direction of the path and rails.

19. The method according to claim 15, wherein the air baffles are configured for positioning in pairs, each pair comprising a first air baffle with a first mounting portion and a separate, second air baffle with a separate second mounting portion, and wherein the method further comprises:
  positioning the first air baffle relative to a first side wall within the tunnel using the first mounting portion and
  positioning the separate, second air baffle relative to a second, opposite side wall within the tunnel using the separate second mounting portion.

20. The method according to claim 19, wherein the positioning of the first and separate second air baffles on their respective side walls comprises arranging the first air baffles on the first side wall in a symmetrical configuration relative to the separate second air baffles on the second, opposite side wall such that an annulus side of each first air baffle is substantially directly opposite an annulus side of each separate, second air baffle.

21. The method according to claim 19, wherein the positioning of the first and separate second air baffles on their respective side walls comprises arranging the first air baffles on the first side wall in an asymmetrical configuration relative to the separate second air baffles on the second, opposite side wall such that the first and second air baffles are arranged in a staggered configuration relative to the longitudinal direction of the tunnel, wherein an annulus side of each first air baffle is not directly opposite of an annulus side of each separate, second air baffle.

22. The method according to claim 15, wherein the positioning of the plurality of air baffles comprises using each mounting portion to position its respective body such that its bottom side is about 5 feet to about 8 feet above the path of the tunnel.

23. The method according to claim 15, wherein the positioning of the plurality of air baffles comprises positioning a vertical centerline through each respective body of the plurality of air baffles at a non-right angle relative to longitudinal direction of the path and the rails.

24. The method according to claim 15, wherein the positioning of the plurality of air baffles positions the top side of each respective body at a distance below a top wall or a ceiling of the tunnel.

25. The method according to claim 24, wherein the positioning of the plurality of air baffles positions each respective body such that its top side is about 10 feet to about 16 feet above the path of the tunnel.

26. The method according to claim 15, wherein the body further comprises a main body part and an extension part, the extension part provided on the annulus side of the body and extending into the annulus of the tunnel, wherein the extension part is provided at a right or obtuse angle relative to the main body part, and wherein the attaching of the plurality of air baffles further comprises positioning the extension part in the annulus of the tunnel.

27. A method for decreasing airflow within a railroad tunnel for passage of a train comprising at least one locomotive and one or more cars, the tunnel comprising an entrance, an exit, and a length extending in a longitudinal direction therebetween and including a path comprising rails for movement of the train therethrough; the method comprising:
  mounting a plurality of air baffles on side walls in the tunnel between the entrance and the exit;
  wherein each air baffle comprises a body and a mounting bracket, the body comprising a top side, a bottom side, a front side, a back side, a mounting side and an annulus side, the annulus side of the body extending into an annulus of the tunnel, the mounting bracket on the mounting side of the body, each mounting bracket mounting each body on a side wall of the tunnel,
  wherein the mounting of the plurality of air baffles comprises inserting fastening devices through openings in the mounting brackets and securing the fastening devices in the openings such that: the annulus side of each body extends into the tunnel and the top side of each respective body is provided at a distance below a top wall or a ceiling of the tunnel, and
  wherein the air baffles are configured to restrict airflow at least in part in the longitudinal direction of the tunnel, thereby increasing a relative difference between the train speed and air speed in the tunnel annulus when the train passes through the tunnel.

28. The method according to claim 27, wherein the mounting of the plurality of air baffles further comprises positioning a bottom side of each respective body at a height above the path and rails of the tunnel.

29. The method according to claim 27, wherein the mounting of the plurality of air baffles comprises positioning the front side or the back side of each respective body of the plurality of air baffles at an acute angle relative to a side wall of the tunnel.

30. The method according to claim 27, wherein each mounting bracket comprises a hinge mechanism configured to enable its respective body to be rotated thereabout and mount the body in a locked position at the acute angle relative to the side wall, and wherein the mounting of the plurality of air baffles further comprises rotating each respective body about the hinge mechanism to position and lock the body at the acute angle relative to the side wall.

31. The method according to claim 27, wherein the body further comprises a main body part and an extension part, the extension part provided on the annulus side of the body and extending into the annulus of the tunnel, wherein the extension part is provided at a right or obtuse angle relative to the main body part, and wherein the mounting of the plurality of air baffles further comprises positioning the extension part in the annulus of the tunnel.

32. The method according to claim 27, wherein the mounting of the plurality of air baffles comprises arranging air baffles on a first side wall of the tunnel in an asymmetrical configuration relative to air baffles on a second, opposite side wall of the tunnel such that an annulus side of the air baffles on the first side wall are arranged in a staggered configuration relative to the air baffles on the second, opposite side wall in the longitudinal direction of the tunnel, and wherein annulus sides of the air baffles on the first side wall are not directly opposite of annulus sides of the air baffles on the second side wall.

33. The method according to claim 27, wherein the mounting of the plurality of air baffles positions a vertical centerline through each respective body at a non-right angle relative to the longitudinal direction of the path and rails.

34. A combination comprising:
  a railroad tunnel for passage of a train comprising at least one locomotive and one or more cars, the railroad tunnel comprising an entrance, an exit, and a length extending in a longitudinal direction therebetween and including a path comprising rails for movement of the train therethrough; and
  a plurality of air baffles mounted within the tunnel, each air baffle comprising a body and a mounting portion, the body comprising a top side, a bottom side, a front side, a back side, a mounting side and an annulus side, the annulus side of the body extending into an annulus of the tunnel, the mounting portion on the mounting side of the body, each mounting portion mounting the body on a side wall of the tunnel and positioning the body inside the tunnel along the length such that the annulus side of the body extends into the tunnel,
  wherein the air baffles are configured to restrict airflow at least in part in the longitudinal direction of the railroad tunnel, thereby increasing a relative difference between the train speed and air speed in the tunnel annulus when the train passes through the tunnel, and
  wherein the mounting portion positions the bottom side of the body at a height above the path and rails of the tunnel.

* * * * *